(12) United States Patent
Sugiyama

(10) Patent No.: US 10,139,715 B2
(45) Date of Patent: Nov. 27, 2018

(54) LIGHT SOURCE DEVICE AND PROJECTOR

(71) Applicant: NICHIA CORPORATION, Anan-shi, Tokushima (JP)

(72) Inventor: Takafumi Sugiyama, Yoshinogawa (JP)

(73) Assignee: NICHIA CORPORATION, Anan-Shi (JP)

( * ) Notice: Subject to any disclaimer, the term of this patent is extended or adjusted under 35 U.S.C. 154(b) by 367 days.

(21) Appl. No.: 14/728,750

(22) Filed: Jun. 2, 2015

(65) Prior Publication Data

US 2015/0362135 A1    Dec. 17, 2015

(30) Foreign Application Priority Data

Jun. 12, 2014   (JP) ................................. 2014-121074

(51) Int. Cl.
*G03B 21/20*    (2006.01)
*F21V 9/30*     (2018.01)
*F21K 9/64*     (2016.01)
*G03B 33/08*    (2006.01)

(52) U.S. Cl.
CPC .............. *G03B 21/204* (2013.01); *F21K 9/64* (2016.08); *F21V 9/30* (2018.02); *G03B 33/08* (2013.01)

(58) Field of Classification Search
CPC ..... F21K 9/56; F21K 9/61; F21K 9/64; F21V 14/06; F21V 14/08; F21V 9/10; F21V 9/16; G03B 21/204; G03B 26/008; G03B 33/08; H04N 9/3111; H04N 9/3114; H04N 9/3117

USPC ........ 315/506; 353/84; 359/722; 362/84, 293
See application file for complete search history.

(56) References Cited

U.S. PATENT DOCUMENTS

| 2005/0030659 | A1* | 2/2005 | Asakawa | G02B 26/008 359/892 |
| 2006/0087847 | A1* | 4/2006 | Yamanaka | H04N 9/3114 362/277 |
| 2009/0284148 | A1  | 11/2009 | Iwanaga | |
| 2011/0116253 | A1* | 5/2011 | Sugiyama | F21S 10/007 362/84 |

(Continued)

FOREIGN PATENT DOCUMENTS

| JP | 2007-156270 A | 6/2007 |
| JP | 2009-277516 A | 11/2009 |

(Continued)

*Primary Examiner* — Zheng Song
(74) *Attorney, Agent, or Firm* — Foley & Lardner LLP

(57) ABSTRACT

A light source device includes a light-emitting element; a base that includes a plurality of segment regions and that is controllable so that light from the light-emitting element sequentially enters the respective segment regions; a fluorescent member that is provided in at least one of the segment regions and that includes a fluorescent material that is excitable by light from the light-emitting element and configured to emit light with a different wavelength from the light emitted from the light-emitting element; and a filter that is provided so as to correspond to at least one of the fluorescent members, which is configured to transmit at least a part of light from the fluorescent material, and which is configured to transmit a part of light that is transmitted through the fluorescent member among the light from the light-emitting element.

21 Claims, 9 Drawing Sheets

(56) References Cited

U.S. PATENT DOCUMENTS

| | | | |
|---|---|---|---|
| 2011/0149549 A1* | 6/2011 | Miyake | F21V 7/22 362/84 |
| 2011/0205502 A1* | 8/2011 | Kato | G03B 21/14 353/84 |
| 2012/0242912 A1 | 9/2012 | Kitano | |
| 2013/0271954 A1* | 10/2013 | Li | H04N 9/3114 362/84 |
| 2015/0062543 A1* | 3/2015 | Ogawa | G03B 33/06 353/84 |
| 2015/0062943 A1* | 3/2015 | Takahira | F21S 48/1225 362/510 |
| 2015/0098065 A1* | 4/2015 | Tanaka | G03B 21/2013 353/84 |
| 2015/0116982 A1* | 4/2015 | Jao | G03B 21/2093 362/84 |
| 2016/0377967 A1* | 12/2016 | Ando | G02B 26/008 362/84 |

FOREIGN PATENT DOCUMENTS

| | | |
|---|---|---|
| JP | 2011-175000 A | 9/2011 |
| JP | 2012-159685 A | 8/2012 |
| JP | 2012-212129 A | 11/2012 |

\* cited by examiner

LIGHT SOURCE DEVICE AND PROJECTOR

CROSS REFERENCE TO RELATED APPLICATIONS

The present application claims priority to Japanese Patent Application No. 2014-121074, filed on Jun. 12, 2014, the content of which is hereby incorporated by reference in its entirety.

BACKGROUND

1. Field

The present disclosure relates to a light source device and a projector.

2. Description of the Related Art

A light source device that includes a light-emitting element and a fluorescent member that is excited by light emitted from the light-emitting element and emits light is known (see Japanese Patent Application Laid-open No. 2009-277516).

SUMMARY

An object of certain embodiments of the present invention is to obtain a desired output and desired chromaticity with a light source device that includes a light-emitting element and a fluorescent member that is excited by light emitted from the light-emitting element and emits light.

A light source device according to one embodiment includes: a light-emitting element; a base that includes a plurality of segment regions and that is controlled so that light from the light-emitting element sequentially enters the respective segment regions; a fluorescent member that is provided in at least one of the segment regions and that includes a fluorescent material that is excited by light from the light-emitting element and emits light with a different wavelength from the light emitted from the light-emitting element; and a filter that is provided so as to correspond to at least one of the fluorescent members, which transmits at least apart of light from the fluorescent material, and which transmits a part of light that is transmitted through the fluorescent member among the light from the light-emitting element.

According to the light source device described above, a desired output and desired chromaticity can be obtained.

DETAILED DESCRIPTION

[Light Source Device 100]

Figure 1:
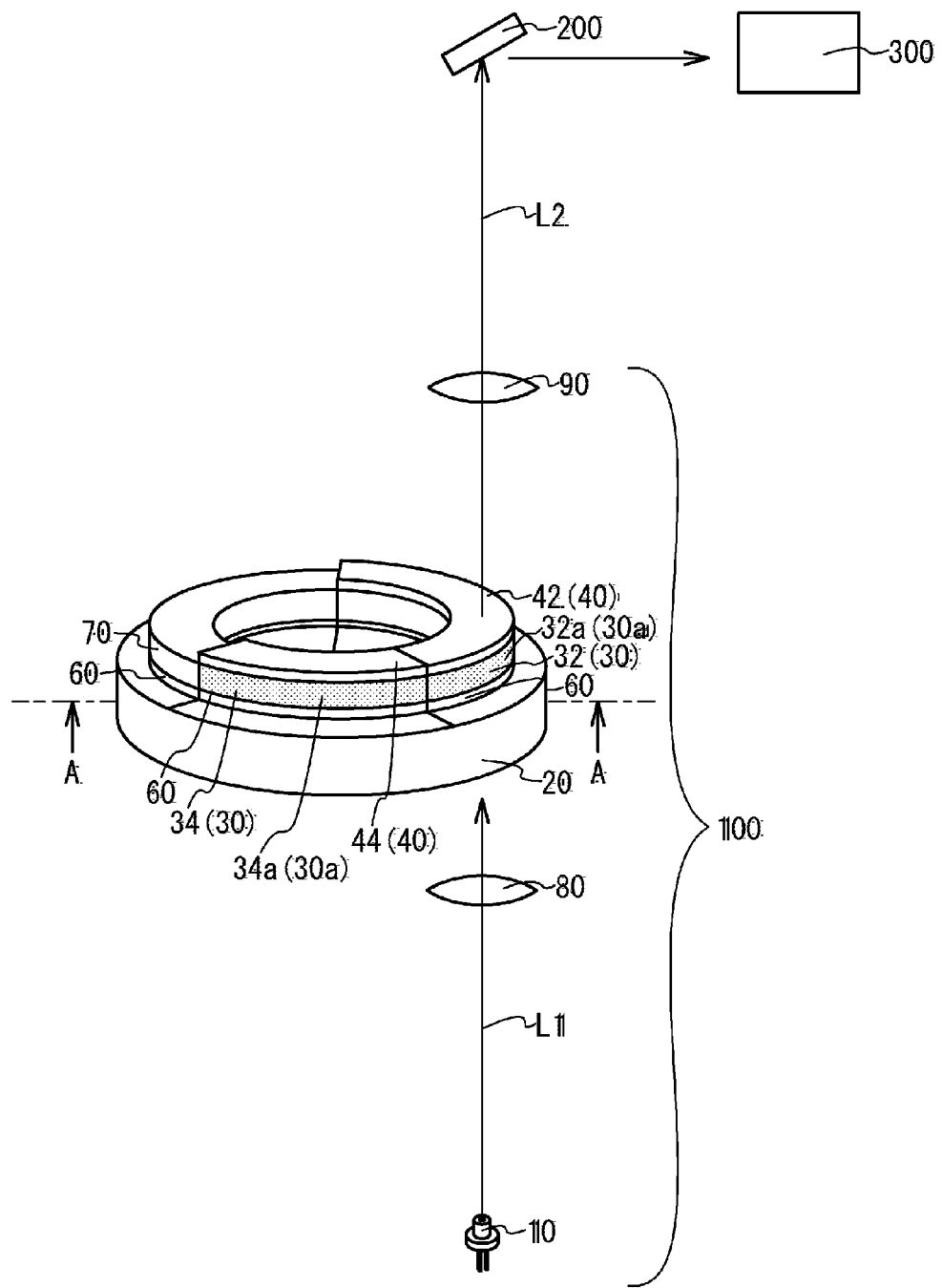
FIG. 1 is a schematic perspective view of a light source device according to a first embodiment.
Figure 2:
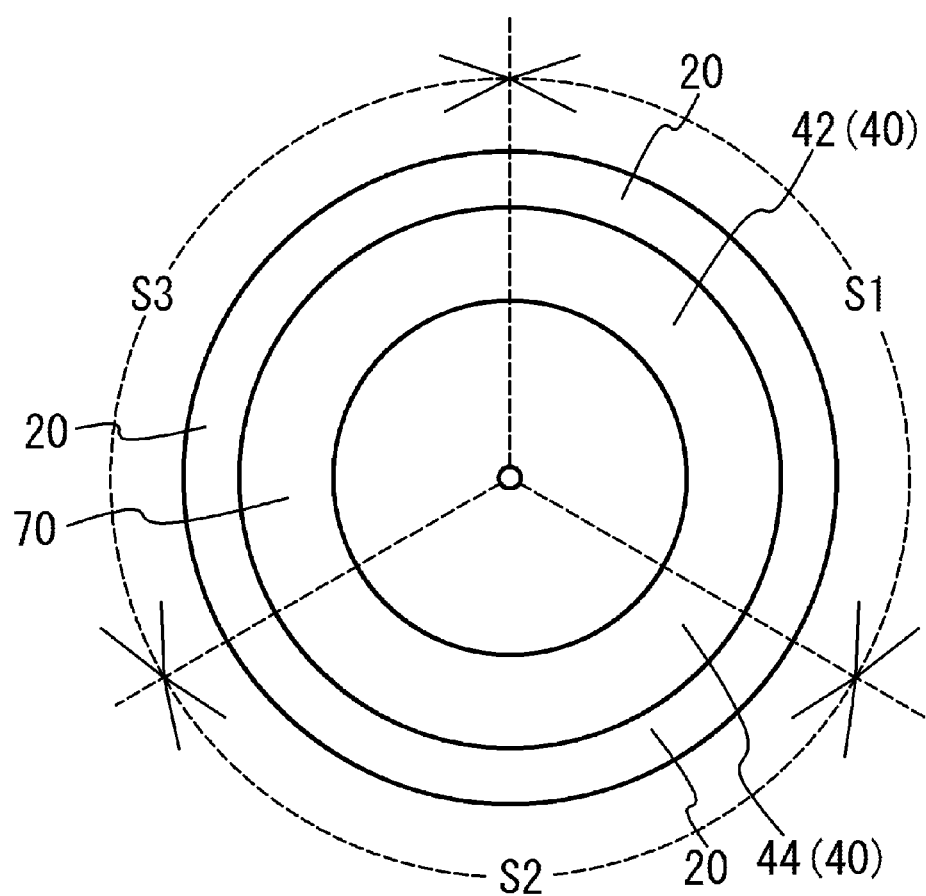
FIG. 2 is a schematic front view of the light source device according to the first embodiment.
Figure 3:
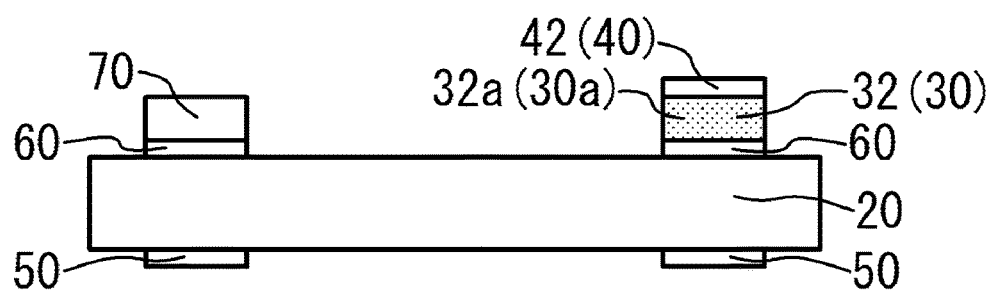
FIG. 3 is a sectional view taken along A-A in FIG. 1.

FIG. 1 is a schematic perspective view of a light source device according to a first embodiment, FIG. 2 is a schematic front view of the light source device according to the first embodiment, and FIG. 3 is a sectional view taken along A-A in FIG. 1.

As shown in FIGS. 1 to 3, the light source device 100 according to the first embodiment includes: a light-emitting element 10; a base 20 that includes a plurality of segment regions S1 to S3 and that is controlled so that light from the light-emitting element 10 sequentially enters the respective segment regions S1 to S3; a fluorescent member 30 that is provided in at least one of the segment regions S1 to S3 and which includes a fluorescent material 30a that is excited by light L1 from the light-emitting element 10 to emit light with a different wavelength from the light L1 emitted from the light-emitting element 10; and a filter 40 that is provided so as to correspond to at least one of the fluorescent members 30, which transmits at least a part of light from the fluorescent material 30a, and which transmits a part of light that is transmitted through the fluorescent member 30 among the light L1 from the light-emitting element 10. With the light source device 100 according to the first embodiment, a desired output and desired chromaticity can be obtained. A detailed description will be given below.

(Light-Emitting Element 10)

As the light-emitting element 10, for example, a light-emitting diode or a laser diode can be used. As a laser diode, a semiconductor laser element that emits blue light (for example, a nitride-based semiconductor laser element) can be used. The blue light from the light-emitting element 10 has an emission peak wavelength that is preferably within a wavelength region of 435 nm or more and 470 nm or less and more preferably within a wavelength region of 440 nm or more and 460 nm or less. The number of light-emitting elements 10 is not limited.

(Base 20)

The base 20 includes the plurality of segment regions S1 to S3. As the base 20, a member with a transmissive property such as borosilicate glass, alkali-free glass, and sapphire can be used. In addition, at least one segment region among the plurality of segment regions S1 to S3 can be constituted by such a transmissive member. A case where all regions of the segment regions S1 to S3 are constituted by transmissive members will be described in the present embodiment, but any one of the segment regions S1 to S3 may be constituted by a member having reflectivity.

A transmissive member refers to a member having a property that transmits light L1 from the light-emitting element 10. As the base 20, a member that transmits 97% or more of the light L1 from the light-emitting element 10 is preferably used and a member that transmits 98% or more of the light L1 from the light-emitting element 10 is more preferably used.

For example, the base 20 can have a disk shape. A thickness of the base 20 can be set to, for example, 0.5 mm.

The number and shapes of the segment regions are not limited. A case where the base 20 includes three fan-shaped segment regions (a first segment region S1, a second segment region S2, and a third segment region S3) will be described in the present embodiment, but this is simply an example. The base 20 may or may not be divided equally into the plurality of segment regions S1 to S3. Each of the segment regions S1 to S3 can be formed in various shapes and sizes at various locations of the base 20.

A non-reflective film 50 (for example, a multilayer film of $SiO_2$ and $Nb_2O_5$) may be provided on a rear surface (a surface to which the light L1 from the light-emitting element 10 enters) of each of the segment regions S1 to S3 in order to prevent reflection of the light L1 from the light-emitting element 10 which enters the base 20. In addition, for example, a bandpass filter 60 (for example, a multilayer film of $SiO_2$ and $Nb_2O_5$) that reflects light from the fluorescent material 30a toward the inside of the fluorescent member 30 may be proved on a side of the fluorescent member 30 to which the light L1 from the light-emitting element 10 enters.

The base 20 is controlled so that the light L1 from the light-emitting element 10 sequentially enters the respective segment regions S1 to S3. A method of controlling the base 20 is not limited. As an example, the base 20 is rotationally controlled so that the light L1 from the light-emitting element 10 sequentially enters the respective segment regions S1 to S3 in a sequence of the first segment region S1→the second segment region S2→the third segment region S3→the first segment region S1→ . . . as shown in FIGS. 1 to 3.

(Fluorescent Member 30)

The fluorescent member 30 is provided in at least one of the segment regions S1 to S3. As an example, among the three segment regions (the first segment region S1, the second segment region S2, and the third segment region S3), the fluorescent member 30 is provided in the first segment region S1 and the second segment region S2 as shown in FIGS. 1 to 3. When the fluorescent member 30 is provided in two or more segment regions, although an individual fluorescent member 30 may be provided in each of the two or more segment regions, one fluorescent member 30 may be provided so as to straddle the two or more segment regions. The third segment region S3 in which the fluorescent member 30 is not provided may be provided with, for example, the non-reflective film 50 (for example, a multilayer film of $SiO_2$ and $Nb_2O_5$) in order to prevent reflection of the light L1 from the light-emitting element 10 which enters the base 20. Alternatively, a diffusing material that diffuses the light L1 from the light-emitting element 10 may be arranged in the third segment region S3 in which the fluorescent member 30 is not provided.

In the present embodiment, a first fluorescent member 32 including a green fluorescent material 32a that emits green light using blue light from the light-emitting element 10 as excitation light and a second fluorescent member 34 including a red fluorescent material 34a that emits red light using blue light from the light-emitting element 10 as excitation light are respectively arranged in the first segment region S1 and the second segment region S2 which are segment regions that differ from each other among the plurality of segment regions S1 to S3. However, this arrangement is simply an example. In this case, "green light" refers to light that has an emission peak wavelength within a wavelength region of 500 nm or more and 570 nm or less. In addition, "red light" refers to light that has an emission peak wavelength within a wavelength region of 570 nm or more and 700 nm or less.

For example, the fluorescent member 30 can be provided on front surface sides (sides of surfaces from which the light L1 from the light-emitting element 10 is emitted) of the first segment region S1 and the second segment region S2 as shown in FIGS. 1 to 3. Alternatively, the fluorescent member 30 can be provided on rear surface sides (sides of surfaces to which the light L1 from the light-emitting element 10 enters) of the segment regions S1 to S3 or provided inside the base 20. When the fluorescent member 30 is to be provided on the front surface sides or the rear surface sides of the segment regions S1 to S3, a thickness of the fluorescent member 30 can be set to a film thickness of, for example, around 50 μm.

The fluorescent member 30 includes the fluorescent material 30a. The fluorescent material 30a is excited by the light L1 from the light-emitting element 10 and emits light with a wavelength that differs from the light L1 from the light-emitting element 10. For example, the fluorescent member 30 can include the green fluorescent material 32a that emits green light with an emission peak wavelength within a wavelength region of 500 nm or more and 570 nm or less using blue light from the light-emitting element 10 as excitation light or the red fluorescent material 34a that emits red light with an emission peak wavelength within a wavelength region of 570 nm or more and 700 nm or less using blue light from the light-emitting element 10 as excitation light.

As the fluorescent member 30, a mixture of the fluorescent material 30a and a binder (for example, $Al_2O_3$) can be used. As the green fluorescent material 32a, for example, a YAG-based fluorescent material, an LAG-based fluorescent material, or a combination thereof can be used. A YAG-based fluorescent material refers to a fluorescent material such as $Y_3Al_5O_{12}$:Ce. An LAG-based fluorescent material refers to a fluorescent material such as $Lu_3Al_5O_{12}$:Ce. When using a combination of a YAG-based fluorescent material and an LAG-based fluorescent material, a laminated fluorescent material such as a fluorescent material in which the YAG-based fluorescent material and the LAG-based fluorescent material form a two-layer structure can be used.

In addition, as the red fluorescent material 34a, for example, a SCASN-based fluorescent material, a CASN-based fluorescent material, a SiAlON-based fluorescent material, a KSF-based fluorescent material, or a combination thereof can be used. A SCASN-based fluorescent material refers to a fluorescent material such as $SrCaAlSiN_3$:Eu. A CASN-based fluorescent material refers to a fluorescent material such as $CaAlSiN_3$:Eu. A SiAlON-based fluorescent material refers to a fluorescent material such as β-SiAlON:Eu and Ca-α-SiAlON:Eu. A KSF-based fluorescent material refers to a fluorescent material such as $K_2SiF_6$:Mn.

When a laser diode is to be used as the light-emitting element 10, an inorganic material is preferably used as a binder. Using an inorganic material enables deterioration of the fluorescent member 30 to be suppressed more effectively as compared to using an organic material (for example, resin). $SiO_2$ or $Al_2O_3$ described earlier is used as one of examples of an inorganic material to be used as the binder.

(Filter 40)

The filter 40 is provided so as to correspond to at least one of the fluorescent members 30. The filter 40 transmits at least a part of light from the fluorescent material 30a and transmits a part of light that is transmitted through the fluorescent member 30 among the light L1 from the light-emitting element 10. Accordingly, not only the light from the fluorescent material 30a but the light L1 from the light-emitting element 10 (in other words, the "excitation light" for exciting the fluorescent member 30) is also emitted from the light source device 100. As a result, a desired output can be obtained in a wide range from low output to high output. In addition, since a part of the light L1 from the light-emitting element 10 is extracted to the outside of the light source device 100 instead of being allowed to stay inside the fluorescent member 30, generation of heat inside the fluorescent member 30 can be suppressed. As a result, the life of the light source device 100 can be extended. Furthermore, since chromaticity of the light from the fluorescent material 30a can be corrected using the light L1 from the light-emitting element 10, desired chromaticity can be obtained. A member that only transmits around 2 to 3% of the light L1 from the light-emitting element 10 (in other words, a member that only leaks a part of the light L1 from the light-emitting element 10) is excluded from the filter 40.

The filter 40 can be arranged on an opposite side of the fluorescent member 30 to the side to which light from the light-emitting element 10 enters. The filter 40 may be separated from the fluorescent member 30 or may be in contact with the fluorescent member 30 (refer to FIGS. 1 to 3). When the filter 40 is separated from the fluorescent member 30, the filter 40 is not affected by heat generated in the fluorescent member 30 and degradation of the filter 40 is less likely to occur. In addition, since a lens can be arranged between the fluorescent member 30 and the filter 40 and an angle of light that enters the filter 40 from the fluorescent member 30 can be adjusted by the lens, the function of the filter 40 can be more easily exerted. On the other hand, when the filter 40 is in contact with the fluorescent member 30, the light source device 100 can be downsized. Examples of a case where the filter 40 is separated from the fluorescent member 30 include a case where the fluorescent member 30 is provided on the base 20 and the filter 40 is provided on another base other than the base 20, and a case where another member is sandwiched between the filter 40 and the fluorescent member 30. When the fluorescent member 30 is provided on the base 20 and the filter 40 is provided on a base other than the base 20, for example, the base 20 and the other base can be synchronously controlled by fixing the base on which the filter 40 is provided and the base 20 on which the fluorescent member 30 is provided to each other using an adhesive or the like.

The filter 40 can have any shape, thickness, and the like. The filter 40 can be provided by, for example, adhesion or sputtering. A diffusion layer 70 that diffuses the light L1 from the light-emitting element 10 can be provided without providing the filter 40 in the third segment region S3 in which the fluorescent member 30 is not provided.

(First Lens 80, Second Lens 90)

The light source device 100 may include members other than those described above such as a first lens 80 and a second lens 90. The light L1 from the light-emitting element 10 enters the first lens 80 and light from the first lens 80 enters the base 20. The light L1 from the light-emitting element 10 and the light from the fluorescent material 30a transmit through the filter 40 and enter the second lens 90 as the combined light L2, and light emitted from the second lens 90 is reflected by a projecting element 200 and enters a displaying element 300. A spherical lens, an aspherical lens, or the like can be used as the first lens 80 and the second lens 90. When a laser diode is to be used as the light-emitting element 10, using such lenses as the first lens 80 and the second lens 90 prevents an occurrence of a situation where the light L1 from the light-emitting element 10 fails to enter the first lens 80 and the second lens 90 and loss occurs. This is because a laser diode has a small light-emitting surface and diffusion of light emitted from the light-emitting surface is small.

As described above, with the light source device 100 according to the first embodiment, a desired output and desired chromaticity can be obtained. Therefore, the light source device 100 according to the first embodiment can be preferably used in a projector, an illuminating device, and the like. The long life of the light source device 100 according to the first embodiment is another reason the light source device 100 can be preferably used in a projector, an illuminating device, and the like.

Hereinafter, the filter 40 will be described in greater detail.

In order to match chromaticity coordinates of light that combines light from the fluorescent material 30a with blue light from the light-emitting element 10 (the combined light L2) with chromaticity coordinates representing a G point among three vertices RGB that constitute a predetermined color gamut, the filter 40 preferably transmits light of a wavelength region including an emission peak wavelength while cutting off light of other wavelength regions among the light from the fluorescent material 30a and transmits a portion of the blue light whose intensity is equal to or smaller than a predetermined intensity.

To transmit a portion whose intensity is equal to or smaller than a predetermined intensity, for example, when using a dielectric multilayer film in which a material having a large refractive index and a material having a small refractive index are alternately laminated as the filter 40, transmittance may be regulated by adjusting the number of laminated layers and film thickness.

With respect to green light, the cutoff of light of wavelength regions other than a wavelength region including an emission peak wavelength among the light from the fluorescent material 30a can be performed by cutting off light in a wavelength region of a longer wavelength than a wavelength region including an emission peak wavelength among light from the green fluorescent material 32a or by cutting off light in a wavelength region of a shorter wavelength than the wavelength region including the emission peak wavelength among the light from the green fluorescent material 32a. The former cutoff (the cutoff of light in a wavelength region of a longer wavelength) causes chromaticity coordinates of green light to shift so as to recede from a red region while the latter cutoff (the cutoff of light in a wavelength region of a shorter wavelength) causes chromaticity coordinates of green light to shift so as to recede from a blue region.

Moreover, with respect to green light, the cutoff of light of wavelength regions other than the wavelength region including the emission peak wavelength among the light from the fluorescent material 30a can also be performed by cutting off both light in a wavelength region of a longer wavelength and light in a wavelength region of a shorter wavelength than the wavelength region including the emission peak wavelength among the light from the green fluorescent material 32a. In this case, a range over which chromaticity in chromaticity coordinates can be shifted can be widened (color reproducibility can be expanded) as compared to a case where only light of one of a wavelength region of a longer wavelength and a wavelength region of a shorter wavelength is cut off. As a result, chromaticity can be more easily shifted to desired chromaticity. When cutting off both light in a wavelength region of a longer wavelength and light in a wavelength region of a shorter wavelength than the wavelength region including the emission peak wavelength among the light from the green fluorescent material 32a, an amount of light that is cut off in the wavelength region of a longer wavelength than the wavelength region including the emission peak wavelength among the light from the green fluorescent material 32a is preferably greater than an amount of light that is cut off in the wavelength region of a shorter wavelength than the wavelength region including the emission peak wavelength among the light from the green fluorescent material 32a. Accordingly, the chromaticity coordinates of green light shifts so as to recede from the red region.

With respect to red light, the cutoff of light of wavelength regions other than a wavelength region including an emission peak wavelength among the light from the fluorescent material 30a can be performed by cutting off light in a wavelength region of a shorter wavelength than a wavelength region including an emission peak wavelength among light from the red fluorescent material 34a or by cutting off light in a wavelength region of a longer wavelength than the wavelength region including an emission peak wavelength among the light from the red fluorescent material 34a. The former cutoff (the cutoff of light in a wavelength region of a shorter wavelength) may cause chromaticity coordinates of red light to shift so as to recede from a red region while the latter cutoff (the cutoff of light in a wavelength region of a longer wavelength) may cause chromaticity coordinates of red light to shift so as to recede from a blue-green region.

Moreover, with respect to red light, the cutoff of light of wavelength regions other than the wavelength region including the emission peak wavelength among the light from the fluorescent material 30a can also be performed by cutting off both light in a wavelength region of a shorter wavelength and light in a wavelength region of a longer wavelength than the wavelength region including the emission peak wavelength among the light from the red fluorescent material 34a. In this case, a range over which chromaticity in chromaticity coordinates shifts can be widened (color reproducibility can be expanded) as compared to a case where only light of one of a wavelength region of a longer wavelength and a wavelength region of a shorter wavelength is cut off. As a result, chromaticity can be more easily shifted to desired chromaticity. When cutting off both light in a wavelength region of a longer wavelength and light in a wavelength region of a shorter wavelength than the wavelength region including the emission peak wavelength among the light from the red fluorescent material 34a, an amount of light that is cut off in the wavelength region of a shorter wavelength than the wavelength region including the emission peak wavelength among the light from the red fluorescent material 34a is preferably greater than an amount of light that is cut off in the wavelength region of a longer wavelength than the wavelength region including the emission peak wavelength among the light from the red fluorescent material 34a. Accordingly, the chromaticity coordinates of red light shifts so as to recede from the blue-green region.

In the present embodiment: a first filter 42 and a second filter 44 are respectively arranged in the first segment region S1 in which the first fluorescent member 32 including the green fluorescent material 32a is arranged and in the second segment region S2 in which the second fluorescent member 34 including the red fluorescent material 34a is arranged; the first filter 42 transmits light of a wavelength region including an emission peak wavelength among the light from the green fluorescent material 32a and cuts off both light in a wavelength region of a longer wavelength and light in a wavelength region of a shorter wavelength than the wavelength region including the emission peak wavelength among the light from the green fluorescent material 32a so that chromaticity coordinates of green light recedes from the red region; and the second filter 44 transmits light of a wavelength region including an emission peak wavelength among the light from the red fluorescent material 34a and cuts off both light in a wavelength region of a longer wavelength and light in a wavelength region of a shorter wavelength than the wavelength region including the emission peak wavelength among the light from the red fluorescent material 34a so that chromaticity coordinates of red light recedes from the blue region.

Specifically, the first filter 42 cuts off light from the green fluorescent material 32a so that an amount of light that is cut off in the wavelength region of a longer wavelength than the wavelength region including the emission peak wavelength among the light from the green fluorescent material 32a is greater than an amount of light that is cut off in the wavelength region of a shorter wavelength than the wavelength region including the emission peak wavelength among the light from the green fluorescent material 32a, and the second filter 44 cuts off light from the red fluorescent material 34a so that an amount of light that is cut off in the wavelength region of a shorter wavelength than the wavelength region including the emission peak wavelength among the light from the red fluorescent material 34a is greater than an amount of light that is cut off in the wavelength region of a longer wavelength than the wavelength region including the emission peak wavelength among the light from the red fluorescent material 34a. The first filter 42 is in contact with the first fluorescent member 32 and the second filter 44 is in contact with the second fluorescent member 34.

Chromaticity coordinates refer to, for example, coordinates on an xy chromaticity diagram conforming to CIE (International Commission on Illumination). Cases where chromaticity coordinates match include cases where chromaticity coordinates completely match as well as cases where chromaticity coordinates approximately match. Cases where a predetermined color gamut is covered include cases where a predetermined color gamut is completely covered as well as cases where a predetermined color gamut is approximately covered. A predetermined color gamut refers to, for example, a color gamut defined by a predetermined standard.

FIRST EXAMPLE

Next, a light source device according to a first example will be described. The light source device according to the first example represents one configuration example of the light source device according to the first embodiment. While the following description will use the same reference numerals as those used in the first embodiment in order to clarify correspondence between the first example and the first embodiment, the use of the same reference numerals is not to be understood as limiting the respective members of the first embodiment to those of the first example. The first example has been performed using a simulation.

Alight source device 100 according to the first example includes the light-emitting element 10, the base 20, the fluorescent member 30 including the fluorescent material 30a, the diffusion layer 70, the bandpass filter 60, and the non-reflective film 50.

In this case, a nitride-based semiconductor laser element that emits blue light with an emission peak wavelength of 445 nm is used as the light-emitting element 10 and glass is used as the base 20. The glass includes the first segment region S1, the second segment region S2, and the third segment region S3.

The fluorescent member 30 includes the first fluorescent member (green fluorescent member) 32 and the second fluorescent member (red fluorescent member) 34, the first fluorescent member (green fluorescent member) 32 includes the green fluorescent material 32a that emits green light with an emission peak wavelength of 525 nm, and the second fluorescent member (red fluorescent member) 34 includes the red fluorescent material 34a that emits red light with an emission peak wavelength of 610 nm. The first fluorescent member 32 is made of $Lu_3Al_5O_{12}$:Ce and a binder $Al_2O_3$ provided on a front side of the first segment region S1 and the second fluorescent member 34 is made of $SrCaAlSiN_3$:Eu and a binder $Al_2O_3$ provided on a front side of the second segment region S2.

The filter 40 includes the first filter (filter for green) 42 and the second filter (filter for red) 44, the first filter 42 is provided on a front side of the first fluorescent member 32, and the second filter 44 is provided on a front side of the second fluorescent member 34. The first filter 42 and the second filter 44 use a multilayer film in which $SiO_2$ and $Nb_2O_5$ are repetitively laminated. The multilayer film uses $SiO_2$ with a refractive index of approximately 1.46 and $Nb_2O_5$ with a refractive index of approximately 2.3. A film thickness and the number of film layers of the multilayer film are designed to enable the first filter 42 and the second filter 44 to transmit a portion whose intensity is equal to or smaller than a predetermined intensity among incident light of approximately 445 nm and transmit light of a predetermined wavelength region including an emission peak among light from the fluorescent material.

The diffusion layer 70 is made of a $SiO_2$ filler and a binder $Al_2O_3$ provided on a front side of the third segment region S3. The bandpass filter 60 is provided on sides of the first fluorescent member 32 and the second fluorescent member 34 to which the light L1 from the light-emitting element 10 enters.

The bandpass filter 60 is also provided on a side of the third segment region S3 to which the light L1 from the light-emitting element 10 enters.

The non-reflective film 50 is constituted by a multilayer film of $SiO_2$ and $Nb_2O_5$ which is provided on a side of rear surfaces of the first segment region S1 to the third segment region S3.

(First Filter 42)

Figure 4A:
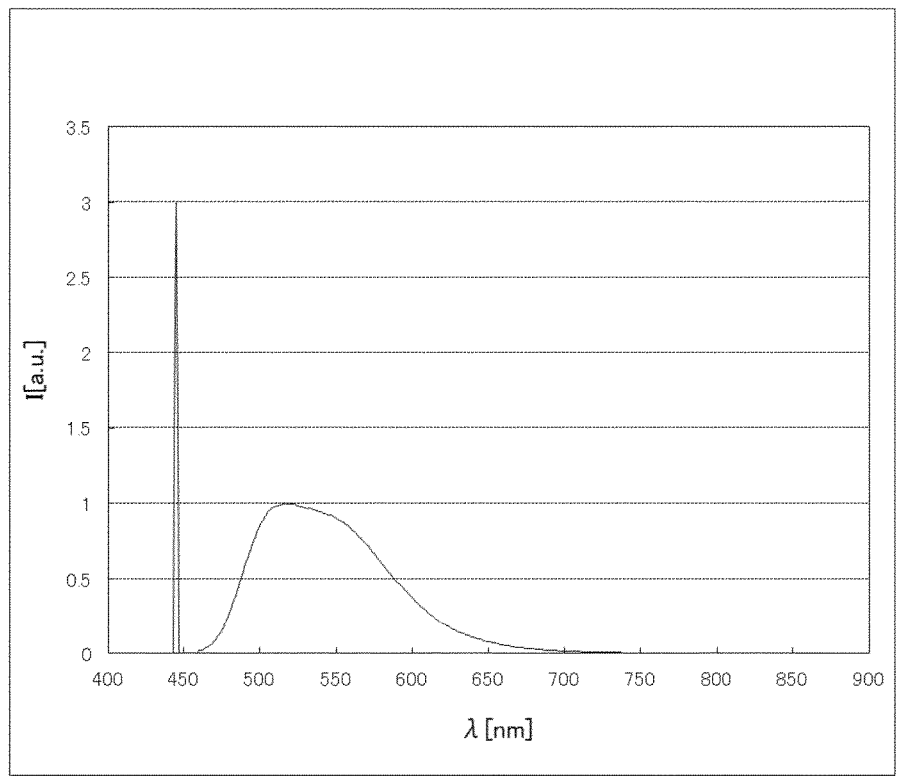
FIG. 4A is a diagram showing an emission spectrum of light output from a light source device as a whole (prior to being cut off and transmitted by a first filter)
Figure 4B:
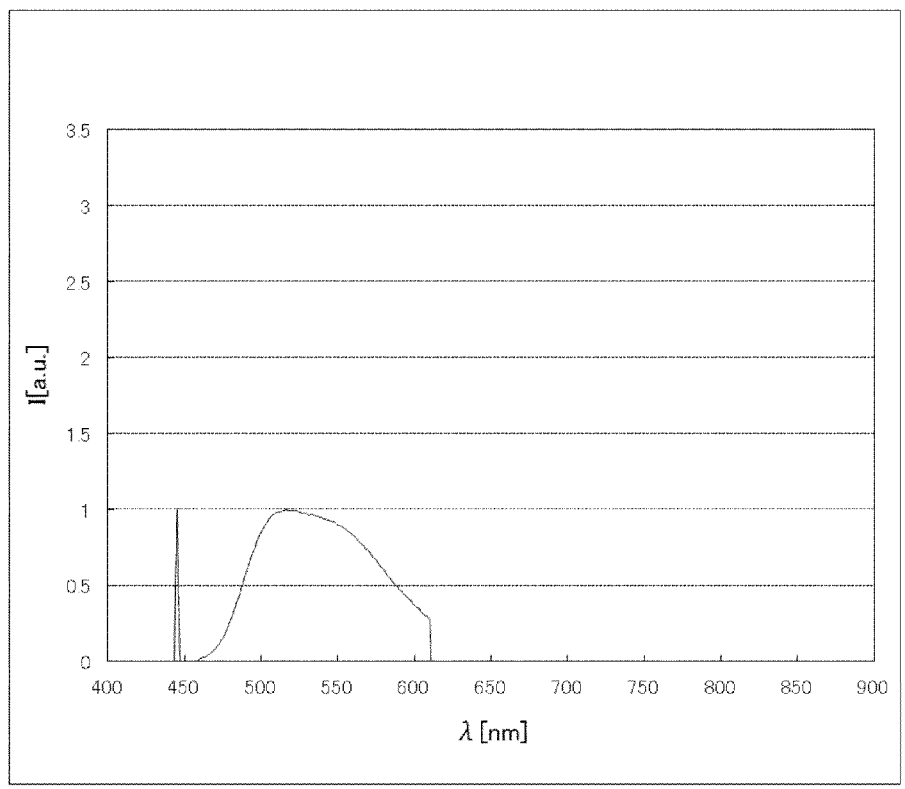
FIG. 4B is a diagram showing an emission spectrum of light output from a light source device as a whole (after being cut off and transmitted by the first filter)
Figure 4C:
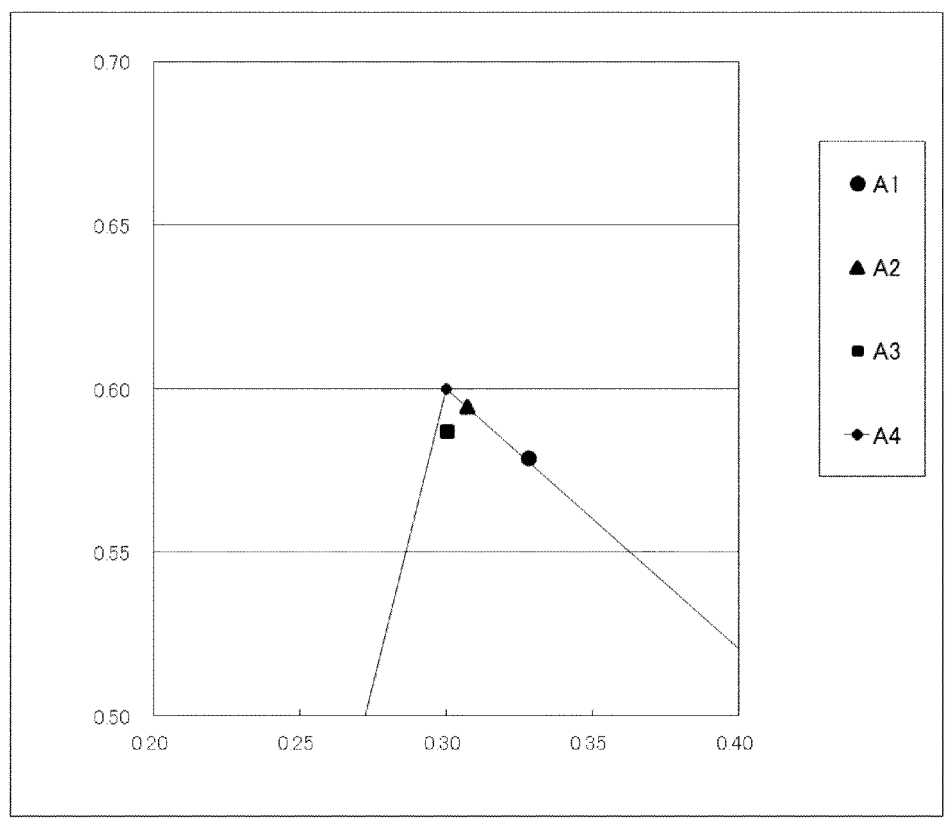
FIG. 4C is a chromaticity diagram that explains a shift in chromaticity coordinates.

FIG. 4A is a diagram showing an emission spectrum of light output from a light source device as a whole (prior to being cut off and transmitted by the first filter), and FIG. 4B is a diagram showing an emission spectrum of light output from the light source device as a whole (after being cut off and transmitted by the first filter). FIG. 4C is a chromaticity diagram that explains a shift in chromaticity coordinates.

As shown in FIGS. 4A and 4B, with respect to green light from the first fluorescent member 32, the first filter 42 cuts off a portion outside of a predetermined "wavelength region" or, more specifically, a portion outside of a wavelength region of 460 nm or more and 610 nm or less. On the other hand, with respect to light from the light-emitting element 10, the first filter 42 transmits a portion whose intensity is equal to or smaller than a predetermined "intensity" or, more specifically, a portion having an intensity that is equal to or lower than the intensity of an emission peak wavelength of green light. Accordingly, chromaticity coordinates of green light from the first fluorescent member 32 are corrected using blue light from the light-emitting element 10 and a color gamut of light emitted from the light source device 100 covers a predetermined color gamut. In other words, as shown in FIG. 4C, if chromaticity coordinates of only the green light from the first fluorescent member 32 are denoted by A1 (xg, yg), then chromaticity coordinates of green light in which a portion outside of the wavelength region of 460 nm or more and 610 nm or less has been cut off may be denoted by A2 (xg−$\Delta xg_{filter}$, yg+$\Delta yg_{filter}$) which represents a shift from A1 by −$\Delta xg_{filter}$, +$\Delta yg_{filter}$ (where $\Delta xg_{filter}$>v0, $\Delta yg_{filter}$>0). However, since the chromaticity coordinates are corrected using blue light from the light-emitting element 10, chromaticity coordinates of light output from the light source device 100 as a whole becomes A3 (xg−$\Delta xg_{filter}$−$\Delta x_{blue}$, yg+$\Delta yg_{filter}$−$\Delta y_{blue}$) which represents a further shift from A2 by 31 $\Delta x_{blue}$, −$\Delta y_{blue}$ and matches (as described earlier, "matches" includes "approximately matches") chromaticity coordinates A4 denoting a G point among three vertices RGB that constitute a predetermined color gamut (A3=A4 or A3≈A4).

(Second Filter 44)

Figure 5A:
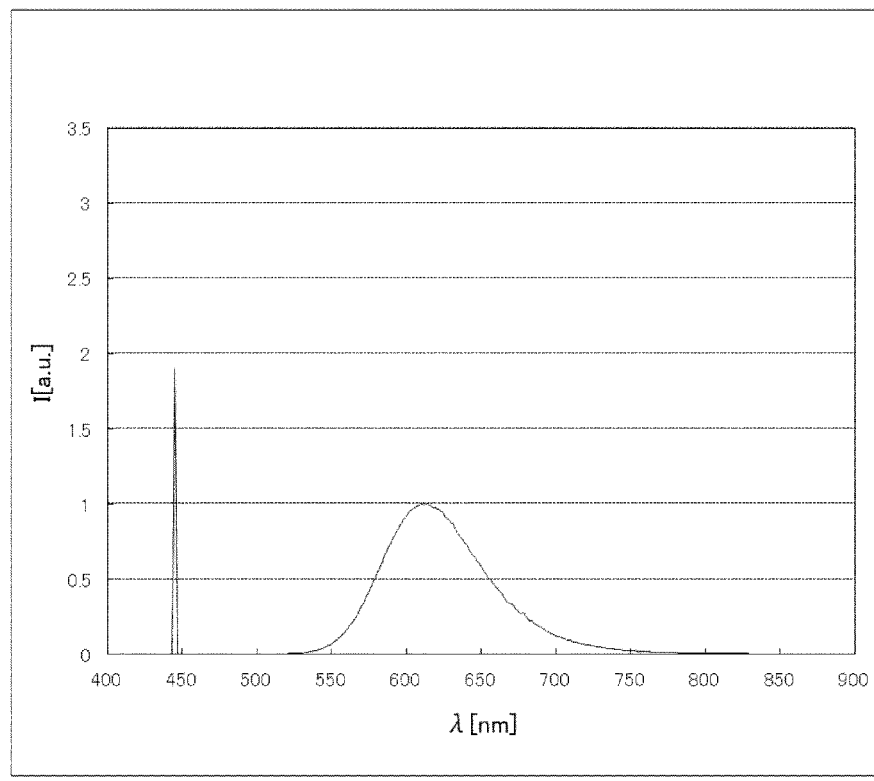
FIG. 5A is a diagram showing an emission spectrum of light output from a light source device as a whole (prior to being cut off and transmitted by a second filter)
Figure 5B:
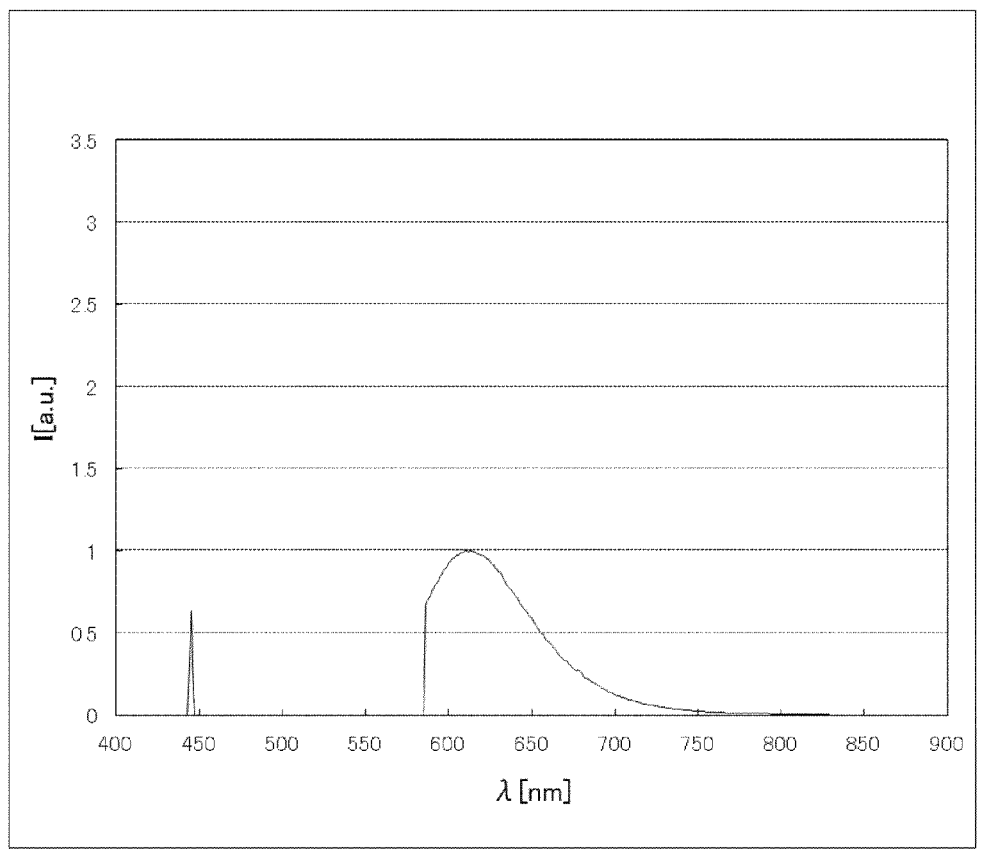
FIG. 5B is a diagram showing an emission spectrum of light output from a light source device as a whole (after being cut off and transmitted by the second filter)
Figure 5C:
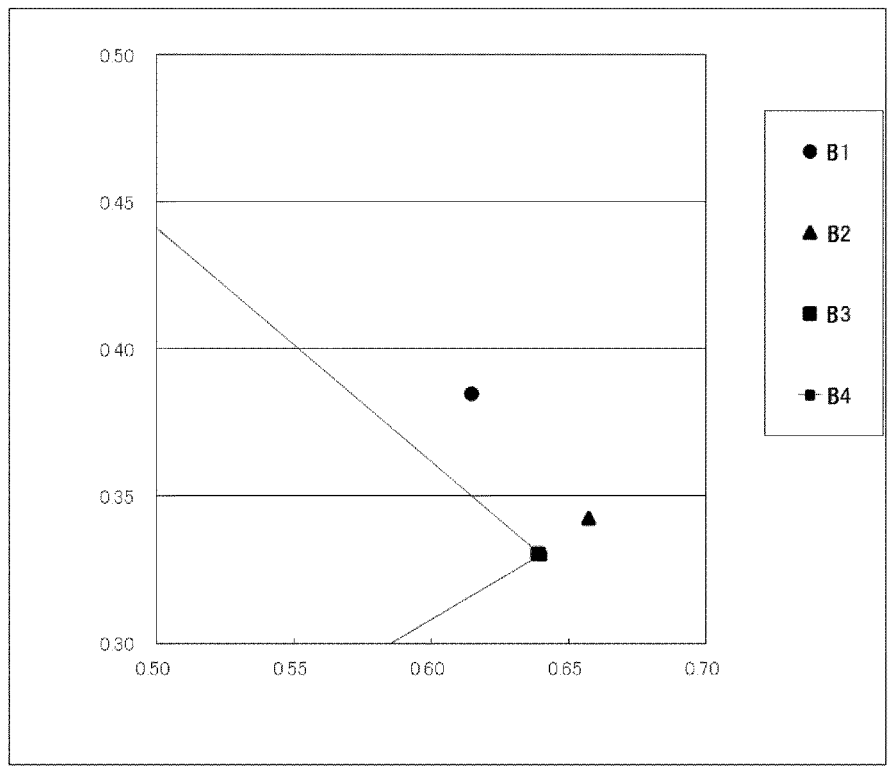
FIG. 5C is a chromaticity diagram that explains a shift in chromaticity coordinates.

FIG. 5A is a diagram showing an emission spectrum of light output from a light source device as a whole (prior to being cut off and transmitted by the second filter), and FIG. 5B is a diagram showing an emission spectrum of light output from the light source device as a whole (after being cut off and transmitted by the second filter). FIG. 5C is a chromaticity diagram that explains a shift in chromaticity coordinates.

As shown in FIGS. 5A and 5B, with respect to red light from the second fluorescent member 34, the second filter 44 cuts off a portion outside of a predetermined "wavelength region" or, more specifically, a portion outside of a wavelength region of 586 nm or more and 800 nm or less. On the other hand, with respect to the light L1 from the light-emitting element 10, the second filter 44 transmits a portion at a predetermined "intensity" or, more specifically, a portion having an intensity that is equal to or lower than 63% of the intensity of an emission peak wavelength of red light. Accordingly, chromaticity coordinates of red light from the second fluorescent member 34 are corrected using blue light from the light-emitting element 10 and a color gamut of light emitted from the light source device 100 covers a predetermined color gamut. In other words, as shown in FIG. 5C, if chromaticity coordinates of only the red light from the second fluorescent member 34 are denoted by B1 (xr, yr), then chromaticity coordinates of light in which a portion outside of the wavelength region of 586 nm or more and 800 nm or less has been cut off may be denoted by B2 (xr+$\Delta xr_{filter}$, yr−$\Delta yr_{filter}$) which represents a shift from B1 by +$\Delta xr_{filter}$, −$\Delta yr_{filter}$ (where $\Delta xr_{filter}$>0, $\Delta yr_{filter}$>0). However, since the chromaticity coordinates are corrected using blue light from the light-emitting element 10, chromaticity coordinates of light output from the light source device 100 as a whole becomes B3 (xr+$\Delta xr_{filter}$+$\Delta x_{blue}$, yr−$\Delta yr_{filter}$+$\Delta y_{blue}$) which represents a further shift from B2 by −$\Delta x_{blue}$, $\Delta y_{blue}$ and matches (as described earlier, "matches" includes "approximately matches") chromaticity coordinates B4 denoting an R point among three vertices RGB that constitute a predetermined color gamut (B3=B4 or B3≈B4). In the present example, since the chromaticity coordinates B4 completely match the chromaticity coordinates B3, a plot of B4 is hidden under a plot of B3 in FIG. 5C. As a result, the plot of B4 is not visible in FIG. 5C.

A comparison of the light source device 100 according to the first example described above with a light source device according to a first comparative example which shares a same configuration with the exception of the first filter 42 and the second filter 44 completely cutting off the light L1 from the light-emitting element 10 shows that, with the light source device 100 according to the first example, since the first filter 42 and the second filter 44 transmit a part of the light L1 from the light-emitting element 10, light emitted from the light source device has a wider emission spectrum than the light source device according to the first comparative example. Therefore, with the light source device 100 according to the first example, output of light emitted from the first segment region S1 and the second segment region S2 is respectively increased by approximately 1.7% and 0.8% as compared to the light source device according to the first comparative example.

A color gamut of light emitted from the light source device 100 according to the first example is a region depicted by an R point (0.640, 0.330), a G point (0.300, 0.600), and a B point (0.150, 0.060) on an xy chromaticity diagram conforming to CIE (International Commission on Illumination). Therefore, with the light source device 100 according to the first example, a color gamut defined by Rec. 709 which is a global standard for high definition television (a region depicted by an R point (0.639, 0.331), a G point (0.300, 0.587), and a B point (0.161, 0.014) on the chromaticity diagram described above) can be substantially covered.

It is to be understood that the embodiment and the example described above only relate to preferred examples and that the configurations described in the following claims are not limited by the foregoing description in any way whatsoever.

What is claimed is:

1. A light source device comprising:
    a light-emitting element configured to emit excitation light;
    a base that includes a plurality of segment regions and that is controllable so that the excitation light from the light-emitting element sequentially enters the respective segment regions;
    a first fluorescent member that is provided in at least a first one of the segment regions and that includes a fluorescent material that is excitable by the excitation light from the light-emitting element and configured to emit a first fluorescence with a different wavelength from the excitation light emitted from the light-emitting element;
    a second fluorescent member that is provided in at least a second one of the segment regions and includes a fluorescent material that is excitable by the excitation light from the light-emitting element and configured to emit a second fluorescence with a different wavelength from the first fluorescence and the excitation light emitted from the light-emitting element
    a first filter that is provided so as to correspond to the first fluorescent member, the first filter being configured to transmit at least a part of the first fluorescence, and being configured to transmit a part of the excitation light that is transmitted through the first fluorescent member; and
    a second filter that is provided so as to correspond to the second fluorescent member, the second filter being configured to transmit at least a part of the second fluorescence, and being configured to transmit a part of the excitation light that is transmitted through the second fluorescent member,
    wherein an intensity of an emission peak wavelength of the excitation light transmitted through the first filter is less than or equal to an intensity of an emission peak wavelength of the first fluorescence transmitted through the first filter, and
    wherein an intensity of an emission peak wavelength of the excitation light transmitted through the second filter is less than or equal to an intensity of an emission peak wavelength of the second fluorescence transmitted through the first filter.

2. The light source device according to claim 1, wherein the light-emitting element is configured to emit blue light as the excitation light.

3. The light source device according to claim 2, wherein:
    the first fluorescent member includes a green fluorescent material that is configured to emit green fluorescence as the first fluorescence using the blue light from the light-emitting element as the excitation light, and
    the first filter is configured to cut off the green fluorescence in a wavelength region of a longer wavelength than a wavelength region including the emission peak wavelength of the green fluorescence.

4. The light source device according to claim 3, wherein the first filter is further configured to cut off the green fluorescence in a wavelength region of a shorter wavelength than the wavelength region including the emission peak wavelength of the green fluorescence.

5. The light source device according to claim 4, wherein the first filter is configured to cut off the green fluorescence so that an amount of the green fluorescence that is cut off in the wavelength region of a longer wavelength than the wavelength region including the emission peak wavelength of the green fluorescence is greater than an amount of the green fluorescence that is cut off in the wavelength region of a shorter wavelength than the wavelength region including the emission peak wavelength of the green fluorescence.

6. The light source device according to claim 2, wherein:
    the first fluorescent member includes a red fluorescent material that is configured to emit red fluorescence as the first fluorescence using the blue light from the light-emitting element as the excitation light, and
    the first filter is configured to cut off the red fluorescence in a wavelength region of a shorter wavelength than a wavelength region including the emission peak wavelength of the red fluorescence.

7. The light source device according to claim 6, wherein the first filter is further configured to cut off the red fluorescence in a wavelength region of a longer wavelength than the wavelength region including the emission peak wavelength of the red fluorescence.

8. The light source device according to claim 7, wherein the first filter is configured to cut off the red fluorescence so that an amount of the red fluorescence that is cut off in the wavelength region of a shorter wavelength than the wavelength region including the emission peak wavelength of the red fluorescence is greater than an amount of the red fluorescence that is cut off in the wavelength region of a longer wavelength than the wavelength region including the emission peak wavelength of the red fluorescence.

9. The light source device according to claim 1, wherein the first filter is in contact with the first fluorescent member.

10. The light source device according to claim 1, wherein the light-emitting element is a semiconductor laser element.

11. A projector comprising the light source device according to claim 1.

12. The light source device according to claim 1, wherein:
    the light-emitting element is configured to emit blue light as the excitation light,
    the first fluorescent member includes a green fluorescent material that is configured to emit green fluorescence as the first fluorescence using the blue light from the light-emitting element as the excitation light, and the second fluorescent member includes a red fluorescent material that is configured to emit red fluorescence as the second fluorescence using the blue light from the light-emitting element as the excitation light.

13. A light source device comprising:
a light-emitting element configured to emit blue light as excitation light;
a base that includes a plurality of segment regions and that is controllable so that the excitation light from the light-emitting element sequentially enters the respective segment regions;
a first fluorescent member that is provided in at least a first one of the segment regions and that includes a green fluorescent material that is configured to emit green fluorescence using the blue light from the light-emitting element as the excitation light;
a second fluorescent member that is provided in at least a second one of the segment regions and includes a red fluorescent material that is configured to emit red fluorescence using the blue light from the light-emitting element as the excitation light,
a first filter that is provided so as to correspond to the first fluorescent member, the first filter being configured to cut off the green fluorescence in a wavelength region of a longer wavelength than a wavelength region including an emission peak wavelength of the green fluorescence, such that the first filter is configured to transmit at least a part of the green fluorescence, and is configured to transmit a part of the excitation light that is transmitted through the first fluorescent member,
a second filter that is provided so as to correspond to the second fluorescent member, the second filter being configured to cut off the red fluorescence in a wavelength region of a shorter wavelength than a wavelength region including an emission peak wavelength of the red fluorescence
wherein an intensity of an emission peak wavelength of the excitation light transmitted through the first filter is less than or equal to an intensity of an emission peak wavelength of the green fluorescence transmitted through the first filter.

14. The light source device according to claim 13, wherein the first filter is further configured to cut off the green fluorescence in a wavelength region of a shorter wavelength than the wavelength region including the emission peak wavelength of the green fluorescence.

15. The light source device according to claim 14, wherein the first filter is configured to cut off the green fluorescence so that an amount of the green fluorescence that is cut off in the wavelength region of a longer wavelength than the wavelength region including the emission peak wavelength of the green fluorescence is greater than an amount of the green fluorescence that is cut off in the wavelength region of a shorter wavelength than the wavelength region including the emission peak wavelength of the green fluorescence.

16. The light source device according to claim 13, wherein the first filter is in contact with the first fluorescent member.

17. The light source device according to claim 13, wherein:
the first filter is further configured to cut off the green fluorescence in a wavelength region of a shorter wavelength than the wavelength region including the emission peak wavelength of the green fluorescence, and
the second filter is further configured to cut off the red fluorescence in a wavelength region of a longer wavelength than the wavelength region including the emission peak wavelength of the red fluorescence.

18. The light source device according to claim 17, wherein:
the first filter is configured to cut off the green fluorescence so that an amount of the green fluorescence that is cut off in the wavelength region of a longer wavelength than the wavelength region including the emission peak wavelength of the green fluorescence is greater than an amount of the green fluorescence that is cut off in the wavelength region of a shorter wavelength than the wavelength region including the emission peak wavelength of the green fluorescence, and
the second filter is configured to cut off the red fluorescence so that an amount of the red fluorescence that is cut off in the wavelength region of a shorter wavelength than the wavelength region including the emission peak wavelength of the red fluorescence is greater than an amount of the red fluorescence that is cut off in the wavelength region of a longer wavelength than the wavelength region including the emission peak wavelength of the red fluorescence.

19. The light source device according to claim 13, wherein the first filter is in contact with the first fluorescent member, and the second filter is in contact with the second fluorescent member.

20. The light source device according to claim 13, wherein the light-emitting element is a semiconductor laser element.

21. A projector comprising the light source device according to claim 13.

* * * * *